United States Patent [19]

Sakakibara et al.

[11] 4,444,719
[45] Apr. 24, 1984

[54] GOLD SOLDERS

[75] Inventors: Yôsuke Sakakibara, Higashimurayama; Takao Kasai, Tokorozawa; Tsuneji Takasugi, Hannô, all of Japan

[73] Assignee: Citizen Watch Co., Ltd., Tokyo, Japan

[21] Appl. No.: 466,902

[22] Filed: Feb. 16, 1983

[30] Foreign Application Priority Data

Mar. 5, 1982 [JP] Japan ................... 57-33942

[51] Int. Cl.³ .............................................. C22C 5/02
[52] U.S. Cl. ..................................... 420/511; 420/587
[58] Field of Search ............... 420/507, 580, 511, 587; 428/672, 641

[56] References Cited

U.S. PATENT DOCUMENTS

| 219,097 | 9/1879 | Hubbell | 420/511 |
| 4,297,416 | 10/1981 | Krug et al. | 428/576 |
| 4,330,329 | 5/1982 | Hayashi et al. | 420/511 |

FOREIGN PATENT DOCUMENTS

| 3019277 | 11/1981 | Fed. Rep. of Germany | 420/511 |
| 153895 | 2/1982 | Fed. Rep. of Germany | 420/507 |
| 985281 | 3/1965 | United Kingdom | 428/641 |

Primary Examiner—L. Dewayne Rutledge
Assistant Examiner—Christopher W. Brody
Attorney, Agent, or Firm—Koda and Androlia

[57] ABSTRACT

This gold solder comprises an Au-Cu-Ag-Ge alloy with 3 to 6% germanium and has a melting temperature of 800° C. or below. The gold content of the gold solder is 50 to 70% equivalent to 12 to 16 Karat. The gold solder that exhibits corrosion resistance corresponding to that of materials such as a gold alloy, stainless steel, stellite and sintered carbide makes it possible to solder at 800° C. or below ornamental parts made of the above materials. As a result, any surface degradation is prevented during the soldering process of mirror-polished ornamental parts.

8 Claims, 3 Drawing Figures

GOLD SOLDERS

BACKGROUND OF THE INVENTION

1. Field of the Invention

This invention relates to gold solders for use in soldering such ornamental parts as watch cases composed of materials such as a gold alloy, stainless steel, stellite, sintered carbide, or the like.

2. Prior Art

Ornamental parts made of the above materials each exhibit excellent corrosion resistance. Therefore, when a plurality of parts are joined by soldering each other, the solder to be used is also required to have excellent corrosion resistance. In such a case, gold solders of Au-Cu-Ag alloys or Au-Cu-Ni alloys containing 50% (equivalent to 12 Karat) or more gold have been used. They have a melting temperature around 850° C. However, when mirror-polished ornamental parts are heated at high temperatures for soldering, their surfaces are often coarsened by recrystallization. After the soldering operation, it is necessary to repolish them, but some shapes are often incapable of repolish.

Table I shows the degradation states caused when various metal surfaces previously mirror-polished by chromic oxide or diamond powders are heated at high temperatures.

TABLE I

Degradation of Mirror-Polished Metal Surfaces Heated at High Temperatures*

| Temp. | Time | SUS304 | Stellite | TaC | WC | 18Kt Au |
|---|---|---|---|---|---|---|
| 750° C. | 15 min | No change | No change | No change | No change | No change |
|  | 60 min | No change | Blurred | No change | Blurred | Pear surface |
| 800° C. | 3 min | No change | No change | No change | No change | No change |
|  | 15 min | Blurred | Blurred | No change | Blurred | Pear surface |
|  | 60 min | — | — | Blurred | — | — |

*heated in a hydrogen atmosphere (dew point −70° C.)

As shown in Table I, in the range of 15 minutes at 750° C. or 3 minutes at 800° C., it is possible to heat the metal surfaces of the 18 Karat gold alloys, stainless steels (SUS304), stellites (Co-base alloy), sintered carbides (TaC and WC) without degrading their mirror-polished surfaces. For this reason, a gold solder having a melting temperature up to 800° C. is desirable.

When Zn, In, Sn and Pb are added to a gold solder containing 50% or more gold, they are known to serve as the elements for lowering the melting temperature of the gold solder. However, the addition of these elements is to a disadvantage in degrading the corrosion resistance and the toughness of the gold solder. Furthermore, since the vapor pressures of the solder becomes high, the vicinities of joined portions are contaminated.

The purpose of the invention is to provide a gold solder having a melting temperature of 800° C. or below without impairing the excellent corrosion resistance and toughness of the conventional gold solder containing 50% or more gold.

SUMMARY OF THE INVENTION

For the above purpose, in this invention, 3 to 6% germanium is added to an Au-Cu-Ag alloy containing 50 to 67% gold so that the melting temperature is 800° C. or below.

DETAILED DESCRIPTION OF THE INVENTION

Many of alloys were prepared in the range of gold 50 to 67%, copper 5 to 40%, silver 5 to 30% and germanium 3 to 6%. Their melting points (solidus and liquidus) were measured, and then each workability for producing the forms of sheet and wire was evaluated.

Figure 1:
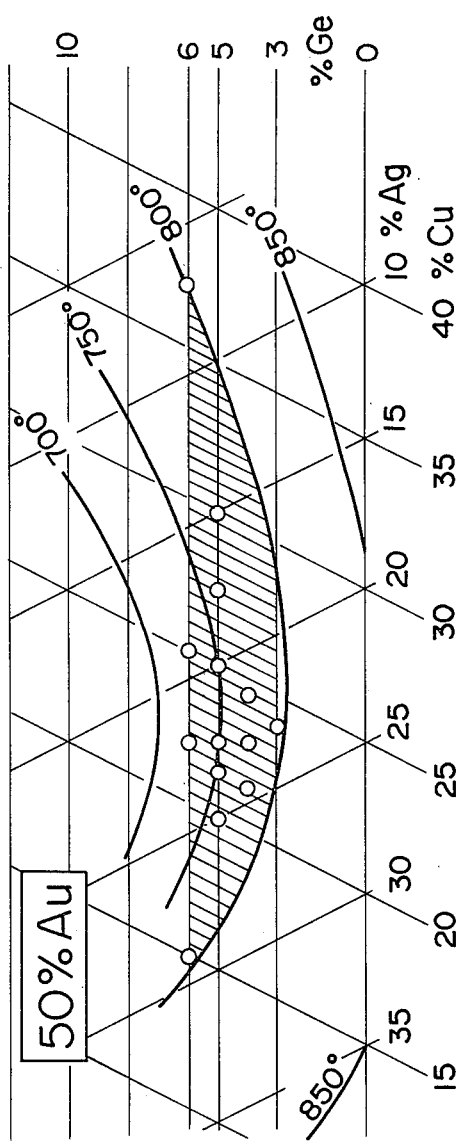
FIG. 1 is a composition map illustrating the contour lines of the melting temperatures of 50% Au-Cu-Ag-Ge alloys according to the present invention.
Figure 2:
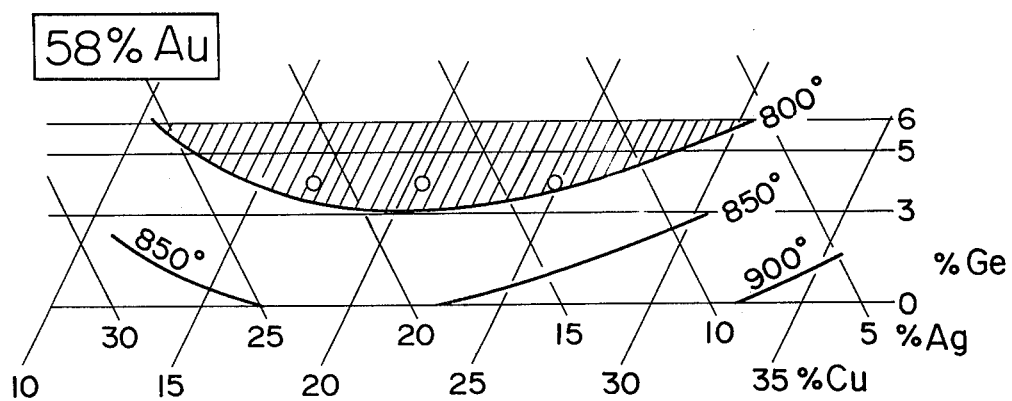
FIG. 2 is a composition map illustrating the contour lines of the melting temperatures of 58% Au-Cu-Ag-Ge alloys according to the present invention.
Figure 3:
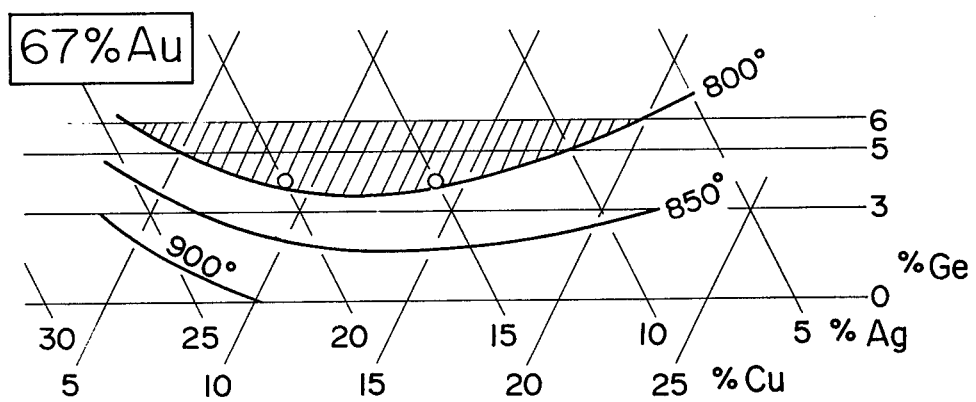
FIG. 3 is a composition map illustrating the contour lines of the melting temperatures of 67% Au-Cu-Ag-Ge alloys according to the present invention.

The result and the alloy compositions are shown in Table II and the contour lines of melting temperatures (i.e. liquidus melting points) are illustrated in FIGS. 1 to 3. In these figures, open circles represent the tested alloy compositions.

TABLE II

Composition, Melting Point and Workability of Gold Solders of This Invention

| Solder Kt | Na | Composition (% by weight) | | | | Melting point (°C.) | | Workability* | |
|---|---|---|---|---|---|---|---|---|---|
|  |  | Au | Cu | Ag | Ge | Solidus | Liquidus | Wire | Sheet |
| 12 Kt (Karat) | 1 | 50 | 15 | 29 | 6 | 630 | 790 | H | E |
|  | 2 | 50 | 37 | 7 | 6 | 650 | 800 | H | E |
|  | 3 | 50 | 25 | 19 | 6 | 535 | 730 | H | E |
|  | 4 | 50 | 22 | 22 | 6 | 505 | 720 | H | E |
|  | 5 | 50 | 20 | 25 | 5 | 500 | 760 | P | E |
|  | 6 | 50 | 21.5 | 23.5 | 5 | 625 | 765 | P | E |
|  | 7 | 50 | 22.5 | 22.5 | 5 | 515 | 730 | P | E |
|  | 8 | 50 | 25 | 20 | 5 | 525 | 740 | P | E |
|  | 9 | 50 | 27.5 | 17.5 | 5 | 520 | 750 | P | E |
|  | 10 | 50 | 30 | 15 | 5 | 630 | 790 | P | E |
|  | 11 | 50 | 21.5 | 24.5 | 4 | 625 | 765 | E | E |
|  | 12 | 50 | 23 | 23 | 4 | 645 | 735 | E | E |
|  | 13 | 50 | 24.5 | 21.5 | 4 | 615 | 760 | E | E |
|  | 14 | 50 | 24 | 23 | 3 | 640 | 780 | E | E |
| 14 Kt | 15 | 58 | 24.8 | 13.2 | 4 | 605 | 790 | H | E |
|  | 16 | 58 | 20.4 | 17.6 | 4 | 635 | 780 | H | E |
|  | 17 | 58 | 16.8 | 21.2 | 4 | 615 | 765 | H | E |
| 16 Kt | 18 | 67 | 9 | 20 | 4 | 670 | 790 | H | E |
|  | 19 | 67 | 14 | 15 | 4 | 660 | 790 | H | E |

*E easy to work
P possible to work
H hard to work

Now, this invention will be explained with reference to the drawing:

FIG. 1 is a composition map illustrating the contour lines of melting temperatures of 50% Au-Cu-Ag-Ge alloys equivalent to 12 Karat gold alloys. The melting temperatures of the 50% Au-Cu-Ag ternary alloys are around 850° C. in the range of 15 to 40% copper, but the addition of 3% or more germanium lowers the temperatures to 800° C. or below.

FIG. 2 is a composition map illustrating the contour lines of melting temperatures of 58% Au-Cu-Ag-Ge alloys equivalent to 14 Karat gold alloys. The melting temperatures of the 58% Au-Cu-Ag ternary alloys are from 850° to 950° C. in the range of 10 to 30% copper, but the addition of 3% or more germanium lowers the temperatures to 800° C. or below.

FIG. 3 is a composition map illustrating the contour lines of melting temperatures of the 67% Au-Cu-Ag-Ge alloys equivalent to 16 Karat gold alloy. The melting temperatures of the 67% Au-Cu-Ag ternary alloys are around 900° C. in the range of 5 to 20% copper, but the addition of 3% or more germanium lowers the temperatures to 800° C. or below.

In the range of the alloy compositions mentioned above, the purpose of the invention is attained by the addition of 3% or more germanium. However, when the germanium content reaches more than 6%, an embrittlement occurs and joint strength is deteriorated, particularly in impact strength. Therefore, the germanium content is limited to 3 to 6%.

Each of the solders based on 50% or more gold exhibit excellent corrosion resistance. But, when the gold content exceeds 67% and reaches, for example, 75% (18 Karat), the melting temperatures cannot be lowered to 800° C. or below even by adding 3 to 6% germanium. Therefore, the gold content is limited to the range of 50 to 67% (12 to 16 Karat).

The gold solders of the invention equivalent to 12 to 16 Karat gold alloys are suitable for soldering not only ornamental parts made of gold alloys but also, stainless steels, stellites, sintered carbides and such, and permit a highly reliable soldering without degrading the surface quality of mirror-polished ornamental parts.

As a result, the gold solders of the invention eliminate the necessity of repolishing after the soldering process. They are most suitable for soldering ornamental parts, expecially having intricate shapes, such as watch cases, necklaces, pendants, or the like.

What is claimed is:

1. A gold solder consisting of 50 to 67% by weight gold, 3 to 6% by weight germanium, 5 to 40% by weight copper and the balance silver.

2. A gold solder according to claim 1 wherein the solder has a melting temperature below 800° C.

3. A gold solder according to claim 1 wherein the gold content is 50% by weight and the copper content is 15 to 40% by weight.

4. A gold solder according to claim 3 wherein the solder has a melting temperature below 800° C.

5. A gold solder according to claim 1 wherein the gold content is 58% by weight and the copper content is 10 to 30% by weight.

6. A gold solder according to claim 5 wherein the solder has a melting temperature below 800° C.

7. A gold solder according to claim 1 wherein the gold content is 67% by weight and the copper content is 5 to 20% by weight.

8. A gold solder according to claim 7 wherein the solder has a melting temperature below 800° C.

* * * * *